United States Patent Office 3,625,094
Patented Dec. 7, 1971

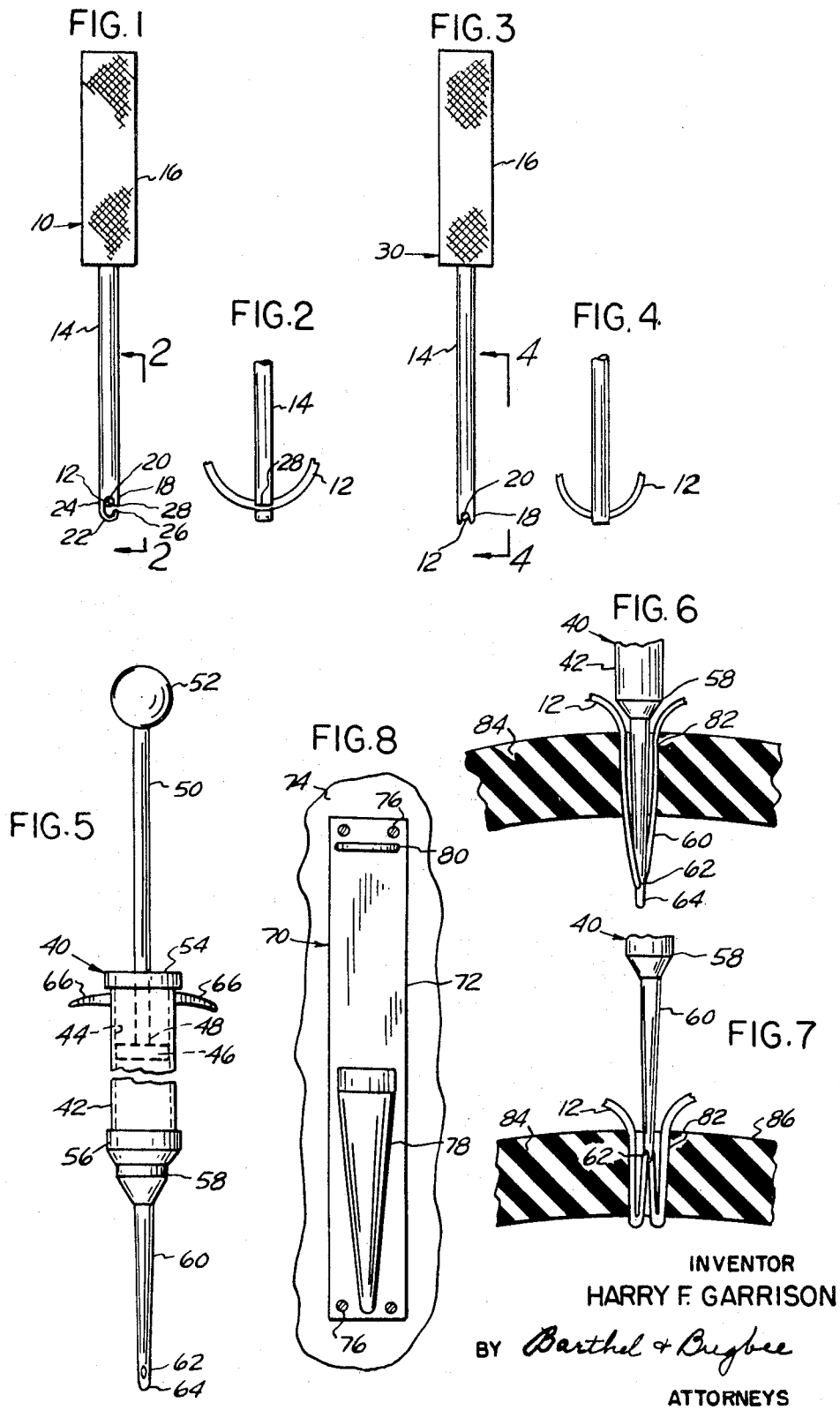

3,625,094
TIRE REPAIR CORD INSERTION TOOL
Harry F. Garrison, 7470 Gerald Ave.,
Warren, Mich. 48092
Original application May 12, 1969, Ser. No. 823,905.
Divided and this application Dec. 15, 1969, Ser.
No. 885,092
Int. Cl. B60c 25/16
U.S. Cl. 81—15.7     1 Claim

ABSTRACT OF THE DISCLOSURE

An elongated elastomeric cord is inserted in a notch, with or without a hook-shaped guard or shield in the forward end of the shank of a tool, coated with suitable elastomeric cement, and this assembly pushed into the hole in the tire to be plugged. In the tool of FIGS. 5 to 7 inclusive, the hollow barrel and nozzle contain rubber cement and a plunger which, after insertion of the elastomeric cord through a hole in the nozzle tip and then into the tire hole, injects rubber cement into the hole to coat the elastomeric cord and wall of the hole therewith. In either form of the invention, the shank of the tool or nozzle is then withdrawn from the hole, converting the V-shaped form of the cord, upon insertion, to a W-shaped form upon removal. The protruding ends of the cord are then cut off flush with the adjacent outer surface of the tire, completing the repair job.

---

This is a division of my co-pending application Ser. No. 823,905, now abandoned, filed May 12, 1969 for Tire Repair Cord Insertion Tool.

In the drawings,

FIG. 1 is a front elevation of a tire repair cord insertion tool for the insertion of an elastomeric repair cord in a tire puncture, the cord being shown in cross-section;

FIG. 2 is a fragmentary side elevation of the lower end portion of the tool shown in FIG. 1, looking in the direction of the line 2—2, therein, with an elastomeric cord;

FIG. 3 is a front elevation of a modified tire repair cord insertion tool generally similar to that of FIG. 1 but omitting the cord-retaining tip;

FIG. 4 is a fragmentary side elevation of the lower end portion of the tool shown in FIG. 3, looking in the direction of the line 4—4 therein;

FIG. 5 is a side elevation of a still further modified tire repair cord insertion tool, with the hollow barrel partly broken away to conserve space;

FIG. 6 is a diagrammatic side elevation of the lower end portion of FIG. 5, holding an elastomeric repair cord and inserted in a puncture hole of a tire shown in cross-section;

FIG. 7 is a view similar to FIG. 6 but with the tool nozzle partially withdrawn from the puncture hole, showing the reversed W-shaped form of the repair cord; and FIG. 8 is a front elevation of a wall rack for holding the further modified tire repair cord insertion tool of FIGS. 5 to 7 inclusive when not in use.

Referring to the drawing in detail, FIG. 1 shows a tire repair cord insertion tool, generally designated 10, for the purpose of inserting an elastomeric cord or rope 92 through a hole in a tire. For that purpose, it consists of a rod 14 seated at its rearward end in a handle 16 and at its forward end 18 provided with a transverse notch 20 and a shield or guard 22. The latter is of hook-shaped or J-shaped form secured at one end 24 to the end 18 of the rod 14 away from its central axis and having its other end 26 spaced away from the rod end 98 to provide a gap 28 therebetween sufficient for the elastomeric cord 12 to be inserted therethrough.

The modified tire repair insertion tool, generally designated 30 of FIGS. 3 and 4 is of substantially identical construction to the tool 10 of FIGS. 1 and 2 except that it omits the hook-shaped guard or shield 22. Accordingly, similar parts bear the same reference numerals in FIGS. 3 and 4 as in FIGS. 1 and 2.

In the use of the tire repair plug insertion tools 10 and 30, the elastomeric cord 12, which may be of natural or synthetic rubber, or compositions thereof, is placed in the notch 20 intermediate its opposite ends, either directly as in FIGS. 3 and 4, or by pushing it through the gap 28 of FIGS. 1 and 2. Having coated the cord 12 with suitable rubber cement or its equivalent, the operator then grasps the handle 16 and aligns the forward end 18 of the rod 14 with the hole in the tire, which preferably has been reamed out with a suitable fluted tapered reamer (not shown).

The user then pushes the repair cord 12 through the hole by pushing upon the handle 16, leaving one end of the cord 12 projecting from the outer end of the hole. In the use of the tool 10, the guard or shield 22 precedes the cord 12 in entering the hole in the tire, and also expands the hole ahead of the cord 12, whereas in the tool 30 of FIGS. 3 and 4, the cord 12 itself has to enlarge the hole as it is pushed through the latter. The operator then withdraws the tool 10 or 30 by pulling outward upon its handle 16, leaving one end of the cord 12 projecting from the hole, the walls of which have been coated with cement either by contact with the cement-coated cord 12 or directly by means of a conventional cement-filled syringe with a hollow needle adapted to be inserted in the hole. The user then cuts off the protruding end of the cord 12 flush with the adjacent surface of the tire and thereby completes the repair.

The further modified tire repair cord insertion tool, generally designated 40, shown in FIGS. 5, 6 and 7 for insertion and cement-coating the elastomeric puncture repair cord 12 consists of a hollow cylinder barrel 42 containing a cylindrical bore 44 in which the head 46 of a piston 48 is reciprocably mounted and operated by a piston rod 50 carrying a handle knob or ring 52 at the outer end thereof. The upper end of the barrel 42 is closed by a screw cap 54 whereas the lower end is closed by the screw head 56 of a nozzle 58 having a hollow tapered spout 60 provided with a transverse hole 62 near the pointed lower end 64 thereof. The barrel 42 near its upper end immediately below the cap 54 is provided with finger holds 66 projecting from the opposite sides thereof and serving as abutments for the fingers when the thumb or opposite hand of the operator is operating the piston 48.

The tire repair tool 40, when not in use, is conveniently housed in a wall holder or fixture, generally designated 70 (FIG. 8) consisting of an elongated mounting plate 72 which is secured to the wall 74 as by fasteners 76 at its upper and lower ends. Secured to the lower portion of the mounting plate 72 is a hollow conical bracket 78 shaped to receive and hold the nozzle 58 and near its upper end is secured a ring 80 which receives the piston rod 50 and handle knob or ring 52.

In the operation of the tire repair cord insertion tool 40, the piston 46 is pushed downward to its lowermost position nearest the nozzle 58 and the spout 60 inserted in a container of rubber cement or other suitable elastomeric cement, and the piston 48 is then pulled upward to draw into the bore 44 a sufficient quantity of the cement. The elastomeric cord 12 is then pushed through the transverse hole 62 in the hollow tapered spout 60 of the nozzle 58 until the hole 62 is approximately midway between the ends of the cord 12. The tip 64 of the nozzle spout 60 is then inserted in the mouth of the puncture hole 82 of the tire 84 (FIG. 6) and pushed downward until a V- shaped portion of the cord 12 is contained within the interior of the tire 84 which will be of sufficient length when withdrawn, to form a four-fold W-shaped body of the redoubled cord 12, as shown in FIG. 7. As the nozzle spout 60 is pushed into the puncture hole 82, the handle 52 of the piston 48 is pushed downward to cause cement to flow out of the opposite sides of the hole 62 around the cord 12 and coat the wall of the puncture hole 82 and the sides of the cord 12 with the cement.

When the nozzle spout 60 has been inserted to the necessary depth (FIG. 6) and the coating of the cement has been accomplished, the operator then applies his fingers to the finger holds 66 to withdraw the nozzle spout 60 from the puncture hole 82, at the same time rotating the tool 40 to simultaneously twist the cord 12 and double the cord back upon itself, thus causing it to assume the W-shaped form indicated in FIG. 7. When the withdrawal of the nozzle tip 64 has been completed, so that the nozzle tip 64 appears above the outer surface 86 of the tire 84, the operator cuts off the protruding ends of the cord 12 flush with the tire surface 84 and allows the cement to solidify. At the same time, the natural resilience of the elastomeric material of the tire 84 pulls the walls of the puncture hole 82 inward to press them against the redoubled and twisted four strands of the cord 12, compressing the latter, plugging the puncture hole 82 tightly and again rendering the tire 84 airtight.

I claim:
1. A tool for inserting and securing resilient tire repair cords in a tire puncture, comprising:
   a hollow cylinder barrel containing a chamber with a piston reciprocable therein,
   and an elongated hollow tire-penetrating nozzle having a passageway therein communicating with said chamber and having one end secured to said barrel and having a pointed opposite end insertable in the puncture and containing a transversely-disposed hole communicating with said passageway and configured and adapted to receive and engage a portion of the cord intermediate the opposite ends of the cord.

References Cited
UNITED STATES PATENTS

| | | | |
|---|---|---|---|
| 610,594 | 9/1898 | Whitbeck | 81—15.5 |
| 614,287 | 11/1898 | Call | 81—15.5 |
| 596,165 | 12/1897 | Jencks | 81—15.7 |
| 1,530,843 | 3/1925 | Meredith, Jr. | 81—15.6 |
| 2,803,284 | 8/1957 | Mullen | 81—15.7 UX |
| 2,866,494 | 12/1958 | Sanderson | 152—370 X |
| 3,174,525 | 3/1965 | Brose | 152—370 |

ROBERT C. RIORDON, Primary Examiner

R. V. PARKER, Jr., Assistant Examiner